Aug. 31, 1965
A. D. HARMON
3,203,496
WEIGHING HEAD FOR WEIGHING MACHINE AND METHOD
Filed July 24, 1963
3 Sheets-Sheet 1
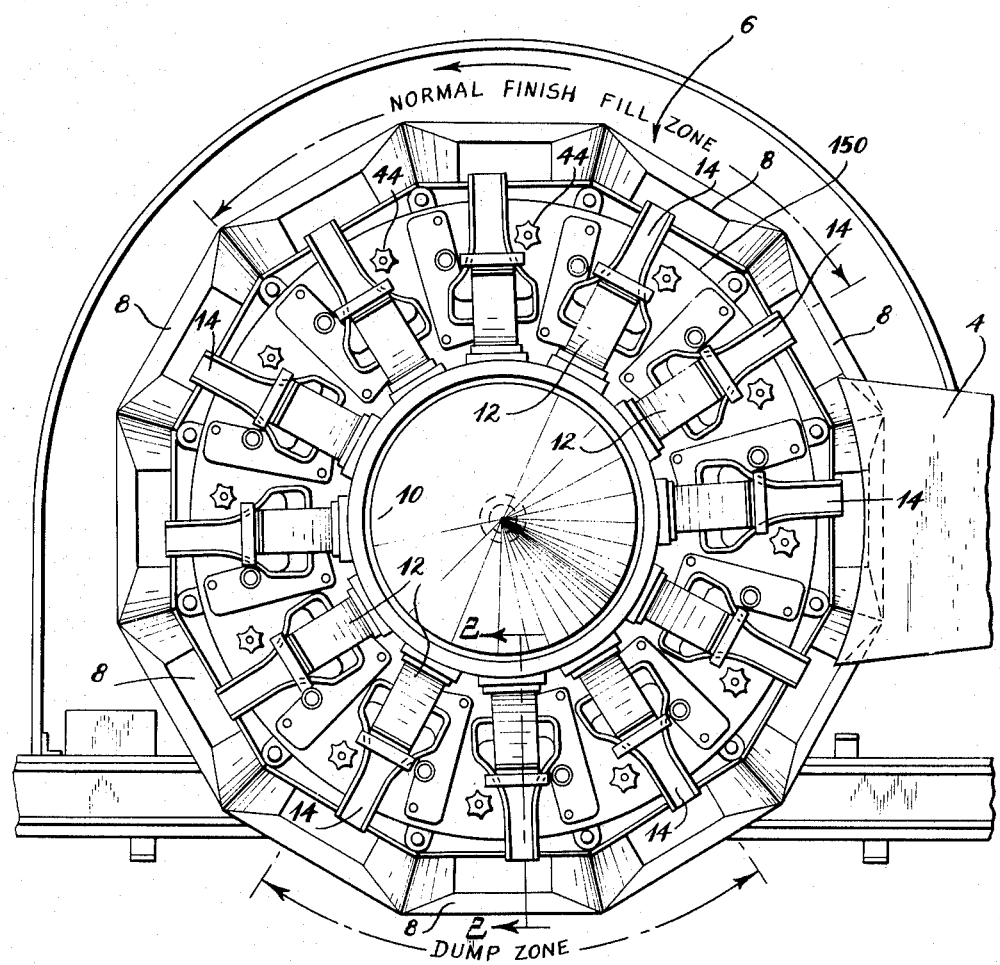
INVENTOR
Albert D. Harmon
BY Bacon & Thomas
ATTORNEYS Aug. 31, 1965   A. D. HARMON   3,203,496
WEIGHING HEAD FOR WEIGHING MACHINE AND METHOD
Filed July 24, 1963   3 Sheets-Sheet 2
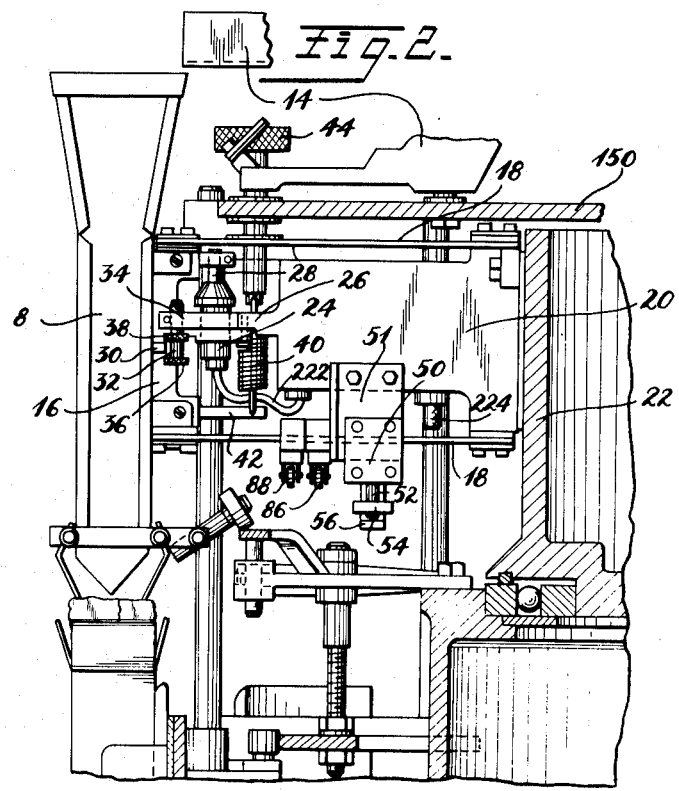
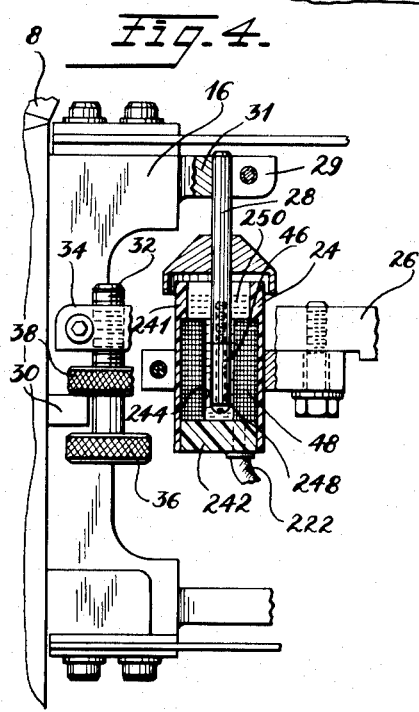
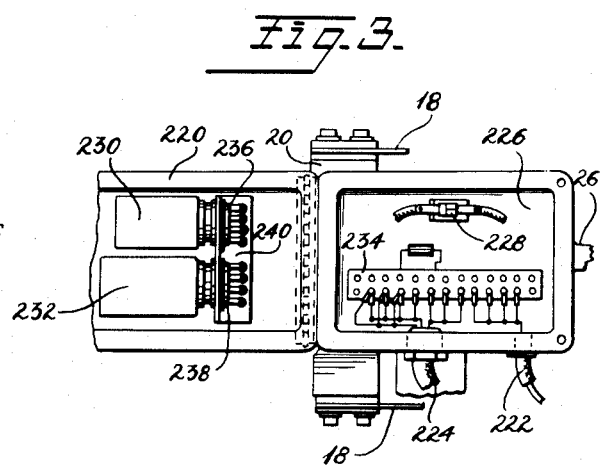
INVENTOR
*Albert D. Harmon*
BY *Bacon & Thomas*
ATTORNEYS INVENTOR
Albert D. Harmon
BY
Bacon & Thomas
ATTORNEYS

United States Patent Office 3,203,496
Patented Aug. 31, 1965

3,203,496
WEIGHING HEAD FOR WEIGHING MACHINE
AND METHOD
Albert D. Harmon, Durham, N.C., assignor to Sperry
Rand Corporation, Wilmington, Del., a corporation of
Delaware
Filed July 24, 1963, Ser. No. 297,338
7 Claims. (Cl. 177—210)

This invention relates to weighing machines and particularly to a weighing head for use with a relatively high speed turret type weighing machine.

This application is a continuation-in-part of the copending application of Harmon, Drake and Petrea, Serial No. 148,994, now Patent No. 3,108,647, filed October 31, 1961.

The machine described and claimed in said copending application includes a plurality of weighing heads on a rotary turret adapted to be rotated at relatively high speeds for weighing charges of material. The present application is concerned with the structure of the weighing head itself wherein a pair of generally horizontal leaf springs support a weighing bucket for vertical weighing movements and a novel electrical means is provided constituting a sensing mechanism for sensing weighing movements of the bucket and at the same time functioning as a vibration dampening device.

The novel weighing head further includes a novel arrangement of compartment means for housing electrical components and novel means for setting the weighing head to detect any selected predetermined weight of material, within practical limits. Another novel feature is an arrangement of leaf springs which assume such position upon the attainment of the desired weight of material in a weighing bucket that centrifugal force acting thereon will have no effect on the weighing function and will not produce spurious weighing movements.

It is, therefore, an object of this invention to provide a machine of the nature set forth having a weighing head which is electrically controlled and wherein all electrical components are housed within a readily accessible compartment and arranged for easy replacement and/or adjustment.

An additional object is to provide an apparatus of the type set forth including a novel detecting and damping means in combination with a weighing head.

Another object is to provide a novel weighing head for a rotary machine where the parts are so related that centrifugal force acting on a weighing bucket and the material therein has no effect on the final weight determination.

A still further object is to provide a weighing head employing cantilever springs for supporting a weighing bucket and in which novel means are provided for regulating the force to be exerted by the bucket on the springs to assume a final weight position at a predetermined level irrespective of the actual weight in the bucket.

Another object is to provide an apparatus of the type described which is relatively simple and economical to construct yet highly efficient and dependable in operation.

Further objects and advantages will become apparent to those skilled in the art as the description proceeds with reference to the accompanying drawings wherein:

FIG. 1 is a diagrammatic top plan view of one form of apparatus embodying the present invention;

FIG. 2 is an enlarged vertical sectional view taken substantially on the line 2—2 of FIG. 1, parts being omitted for clarity of illustration;

FIG. 3 is an enlarged detailed view of the electrical compartment of a weighing head;

FIG. 4 is a further enlarged view of a portion of the mechanism shown in FIG. 2, with additional parts shown in section;

Figure 5:
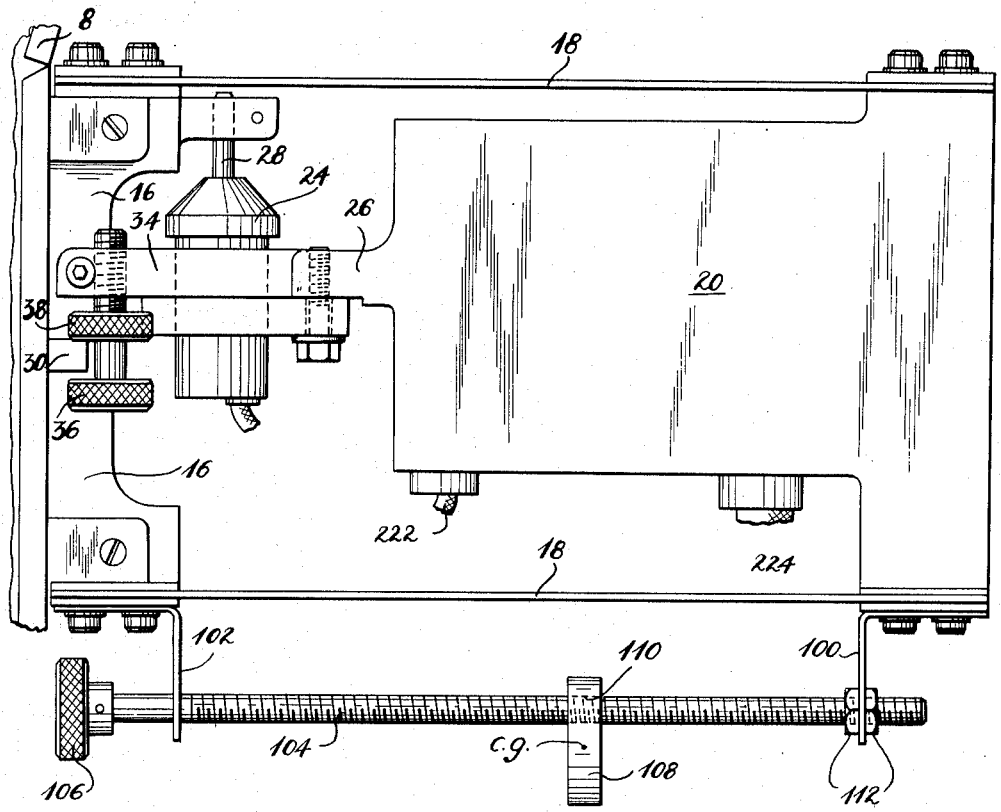
FIG. 5 is a diagrammatic side view of a modified form of weighing head.

FIG. 1 is a schematic top plan view of the machine more fully described and claimed in the copending application referred to above. However, in general, it comprises a feed conveyor 4 for feeding bulk material into open weighing buckets 8 carried on the periphery of a turret 6. As the turret rotates, bulk charges are disposed in the buckets 8 and thereafter dribble streams of material are fed into the buckets, by dribble conveyors 14 receiving material from chutes 12 supplied by a container 10, all mounted on the turret. The dribble conveyors and related mechanisms are mounted on an upper plate 150 constituting a part of the turrent. Each of the weighing buckets 8 is vertically movable to respond to the weight of material therein and the vertical movements thereof control the operation of the dribble feed conveyors 14, all as fully pointed out and described in said copending application.

Referring now to FIG. 2, each weighing bucket 8 is fixedly mounted on a support block 16 which is arranged generally vertically with its upper and lower ends respectively secured to generally horizontal leaf springs 18. The inner ends of the leaf springs 18 are secured to a box-like support 20 which in turn is mounted on an upstanding annular flange portion 22 of the turret 6.

A differential trasnformer 24, to be described in greater detail later, is mounted on a bracket 26 carried by the support 20 and an actuator rod 28 is mounted on the block 16 for movement therewith by being clamped between ears 29 of a split bracket 31 on block 16. The block 16 is further provided with a laterally extended ear 30 (FIG. 4) adjacent which a screw 32 extends. The screw 32 is adjustably mounted on an extension 34 of the support arm 26 and can be threadedly adjusted therein. A pair of collars 36 and 38 are fixed on the screw 32 and constitute upper and lower stops for ear 30 to limit the vertical movement of the block 16 to a very minute range of movement. A balancing spring 40 (FIG. 2) is attached to a lower arm 42 of the block 16 and its tension may be adjusted by means of a handwheel 44 to make minute adjustments in the amount of force required to move core 46 to a predetermined position where a detector breaks into oscillation, as will be further described. Preferably, the spring 40 supports less than 5% of the gross weight of the weigher head. The parts are so adjusted that no downward movement of the block 16 takes place until the final weight of material is deposited in the weighing bucket 8. When that condition is achieved, a slight downward movement of block 16 moves rod 28 downwardly relatively to the differential transformer 24 and moves a paramagnetic core 46 in the field of coils 48 to a position to produce a predetermined transformation ratio between the coils of transformer 24. When that ratio is reached, the detector 232 (FIG. 3) breaks into oscillation and produces an A.C. signal indicating achievement of final weight. That signal is amplified and employed, in a well-known manner, to stop operation of the associated dribble feed conveyor 14 and to thus terminate deposit of material in the associated weighing bucket 8. The structure of the weighing head and the basic features of the transformer as described above are more or less conventional and will be understood by those skilled in the art. It is believed that no further detailed description thereof will be necessary since the employment of such a signal to stop a feed conveyor is known. However, it is to be noted that rod 28 can be vertically adjusted in bracket 31 so that the predetermined transformation ratio mentioned occurs when ear 30 is floating about midway between collars 36 and 38.

Also mounted in fixed relation to each box-like support 20 is a solenoid 50 hoving a vertically moving plunger 52 provided with an enlarged detector head 54 in the lower end thereof. The solenoid 50 is mounted on bracket 51 which in turn is secured to support 20. A retainer strap 56 limits the downward movement of the plunger 52. Each solenoid 50 is so arranged in the operating circuit for its dribble feed conveyor 14 that when the conveyor is in operation, the plunger 52 is in its lowermost position with head 54 substantially resting on strap 56. When the dribble feed conveyor 15 is de-energized and not operating, the plunger 52 is pulled to its uppermost position and held in that position. The purpose for and functions of the plunger 52 and head 54 are fully described in the co-pending application previously referred to, as are the switches 86 and 88 which are also mounted on the compartment 20.

Referring now to FIG. 3, the box-like compartment 20 previously referred to is in the form of a hollow compartment having a door 220 hinged to the inner edge thereof. The door 220 is on the remote side of compartment 20 as viewed in FIGS. 2 and 5. Suitable cables 222 and 224 lead electrical conductors into the compartment 226 from the various switches described, the differential transformer 24 and other electrical components of the machine. The circuits will not be described in detail since the manner of arranging same will be obvious to those skilled in the art, and all of the wiring is not shown in FIG. 3. However, all possible electrical components such as rectifier 228 and a relay and detector, indicated as 230 and 232, along with a suitable terminal strip 234 are located in the compartment 226 when the door 220 is closed. Numerals 230 and 232 indicate certain components which may be a relay and/or detector and associated circuitry, mounted in containers having conventional prongs thereon, connected to the circuitry therein, and removably mounted in sockets 236 and 238 carried by a bracket 240 mounted on the inner face of door 220. By this arrangement the electrical components may be serviced, replaced or adjusted by simply opening the door 220 and without necessitating complete or even partial dismantling of any part of the machine. Each compartment can be reached between the lower portions of buckets 8, which are spaced apart as seen in FIG. 1. The compartment 226 in box 20 is located between the leaf springs 18 in space that would otherwise be unoccupied and closely adjacent the switches 86 and 88, the solenoid 50, conveyors 14 and differential transformer 24, thus keeping the length of wiring to a minimum, and serving to make the entire machine highly compact.

Referring now to FIG. 4, the differential transformer 24 comprises an outer shell portion 241, closed and sealed at its bottom by a plug member 242. The differential transformer coils 48 (not separately shown) are housed within the shell 241 and are arranged to define a vertical passageway 244 therethrough. The rod 28 is of non-magnetic material, for example aluminum, whereas the core portion 46 is of paramagnetic material so as to vary the coupling between the different coils upon relative movement between the coils and core. At least the core 46 is of a dimension to move freely into the passageway 244 but sufficiently large to define, with the inner surface of the coils, a restricted annular passageway 248. A suitable dampening oil or other liquid 250 is placed in the shell 241 and is of sufficient depth so that at least the core 46 and the coils 48 are completely submerged. The liquid 250 functions as a dampening means, the core 46 and the passageway 248 having the characteristics of a dash pot, to dampen vibrations that might otherwise cause spurious signals in the associated circuitry. A particular advantage of the arrangement shown is that the dampening means (dash pot) is coincident with the movable core and there is no possibility for vibrations to be generated between the movable core and the dampening means, as would be the case if a separate dashpot were used externally of the differential transformer.

Now referring to FIG. 5, which is a schematic side view similar to FIG. 2 but showing a modified form of adjusting means. In this form of the invention, the spring 40 and hand wheel 44 are omitted. The support 20 is provided with a downwardly directed resilient bracket 100 and the block 16 is provided with a similar resilient bracket 102. A threaded rod or screw 104 is journalled in the brackets 100 and 102 and is provided with a hand wheel 106. A weight member 108 is provided with a threaded bore 110 embracing the threads of the rods 104 and is so shaped and configured that its center of gravity is substantially below the axis of the screw 104. Suitable lock nuts or the like 112 secure the screw 104 in axial position in the brackets 100 and 102 but permit free rotation thereof. It will be apparent that rotation of screw 104 will cause the weight member 108 to progress axially along the screw while remaining pendulous therebelow. The effect of such radial displacements of the weight member 108 is to change the effective upward force of springs 18 on weighing bucket 8 so that a different predetermined weight of material in the bucket will be necessary to cause the ear 30 to move away from upper collar 38 upon achievement of the desired weight of material. Obviously the adjustment just described is made prior to operating the machine for weighting a predetermined charge of material and is left so adjusted until a different weight of charge is desired.

As an alternative, the screw 104 could be rigidly secured to the brackets 100 and 102 and adjustment effected by merely rotating the weight 108 on the screw and thus achieve adjustment. In the latter case, the center of gravity of the weight could be coincident with the axis of the screw unless a step-by-step adjustment is desired. As stated previously, the brackets 100 and 102 are resilient. Thus, vertical movements of the block 16 result in similar and equal movements of the outer end of the screw 104 while its inner end remains supported by the support 20. The resilience of the brackets permits a slight tilting of the axis of screw 104 with respect to both the support 20 and block 16 to minimize binding in those regions.

Since the weighing head of the present invention is designed for use in a high speed rotary turret, provision must be made for nullifying the effect of centrifugal force on the weighing bucket and associated parts, particularly with a charge of material therein. If the parts are so arranged that the inner and outer ends of the springs 18, where they are secured to the support 20 and the block 16, are at exactly the same level when full weight is achieved in the weighing bucket, then centrifugal force applies only tension to the springs 18 without any vertical component capable of causing spurious weighting movements. It is, therefore, contemplated that the springs 18 be bent or deformed so as to extend slightly upwardly and outwardly from the support 20 when the weighing bucket 8 is empty and the force of the springs supporting a full charge of weighed material permits their deflection only to the position where their inner and outer ends are at the same level.

Figure 6:
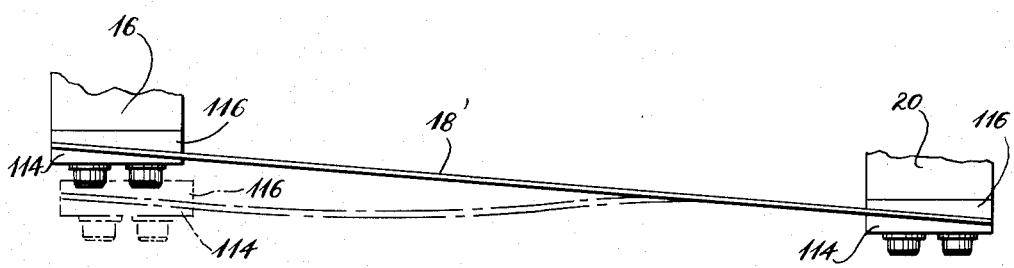
FIG. 6 is a schematic view of a further modified form of leaf spring mounting.

An alternative manner of achieving the above result is schematically illustrated in FIG. 6 wherein the spring 18' (only one of two springs shown) is substantially perfectly straight from end to end but is secured to the support 20 between wedge shaped clamping blocks 114 and 116 so that it normally extends outwardly and upwardly therefrom, as shown by solid lines in FIG. 6. Identical wedge shaped clamping blocks 114 and 116 may be used to clamp the outer ends of the springs 18' to the block 16. Thus, the spring in its normal position holds the weighing bucket slightly elevated and when full weight is achieved, the block 16 moves downwardly to the dotted line position wherein the outer end of the spring is at the same level as the inner end thereof, thus nullifying the effects of centrifugal force.

While a limited number of specific embodiments of the invention have been shown and described herein, it is to be understood that the same are merely illustrative of the principles involved and that other forms are contemplated within the scope of the appended claims.

I claim:

1. In a weighing apparatus; a movable support; a pair of vertically spaced generally parallel leaf springs mounted at their inner ends on said support; a weighing bucket mounted on and spanning the outer ends of said leaf springs; means for detecting vertical movement of said bucket to a predetermined level; and adjustable means operatively connected to said bucket and said support for changing the effective resistance of said springs to downward movement of said bucket, said adjustable means comprising a longitudinal guide, generally parallel to said leaf springs, and having one end carried by said support and the other end carried by means fixed relative to said bucket; and a weight member adjustable movable along side guide.

2. Apparatus as defined in claim 1 wherein said guide is a rigid member; the ends of said guide being secured to said support and to said means fixed relative to said bucket, respectively, by flexible means whereby to be capable of pivotal movement at each end.

3. In a weighing apparatus; a movable support; a pair of vertically spaced generally parallel leaf springs mounted at their inner ends on said support; a weighing bucket mounted on and spanning the outer ends of said leaf springs; means for detecting vertical movement of said bucket to a predetermined level; and adjustable means operatively connected to said bucket and said support for changing the effective resistance of said springs to downward movement of said bucket, said adjustable means comprising a threaded rod, generally parallel to said leaf springs; and having one end carried by said support and the other end carried by means fixed relative to said bucket; and a weight member threadedly adjustable along said rod, the center of gravity of said weight member being eccentric to the axis of said rod.

4. Apparatus as defined in claim 3 wherein said threaded rod is mounted for rotation about its longitudinal axis; and means for rotating said rod.

5. In a rotary weighing apparatus: a support rotatable about a vertical axis; a pair of generally parallel leaf springs secured at their inner ends to said support to extend generally radially outwardly therefrom; a weighing bucket mounted on and spanning the outer ends of said leaf springs and being supported thereby for vertical weighing movement; the outer ends of said leaf springs being normally higher than their inner end when said bucket is empty and by an amount such that the inner and outer ends thereof are at the same level when said bucket contains a predetermined desired weight of material whereby centrifugal force, created by rotation of said support about said axis, will not produce spurious weighing movements of said bucket.

6. Weighing apparatus as defined in claim 5 wherein the ends of said leaf springs are fixedly secured to extend horizontally, the portions of said springs between their ends being bent to position said outer ends higher than said inner ends.

7. Weighing apparatus as defined in claim 5 wherein said leaf springs are straight and wherein the ends thereof are secured at an angle extending upwardly and outwardly from said support.

References Cited by the Examiner

UNITED STATES PATENTS

| 1,540,298 | 6/25 | White | 177—229 X |
| 1,880,563 | 10/32 | Weckerly | 177—210 |
| 2,969,228 | 1/61 | Appius | 177—229 |
| 3,039,069 | 6/62 | Shipes | 336—30 |
| 3,080,936 | 3/63 | Sher et al. | 177—210 |
| 3,084,298 | 4/63 | Frisina | 336—30 |
| 3,107,743 | 10/63 | Knobel | 177—116 |
| 3,113,632 | 12/63 | Knobel | 177—79 |

FOREIGN PATENTS 66,665   8/43   Norway.

LEYLAND M. MARTIN, *Primary Examiner.*

LEO SMILOW, *Examiner.*